United States Patent [19]

Bradley

[11] 4,261,428
[45] Apr. 14, 1981

[54] PLATFORM WEIGHING APPARATUS
[75] Inventor: Chester D. Bradley, Darien, Conn.
[73] Assignee: The A. H. Emery Company, New Canaan, Conn.
[21] Appl. No.: 124,445
[22] Filed: Feb. 25, 1980
[51] Int. Cl.³ .................. G01G 5/04; G01G 21/24
[52] U.S. Cl. ................................. 177/208; 177/255
[58] Field of Search ............................. 177/255, 208

[56] References Cited

U.S. PATENT DOCUMENTS

| 2,584,949 | 2/1952 | Weckerly | 177/255 X |
| 2,742,278 | 4/1956 | Carleton, Jr. | 177/255 X |
| 3,658,142 | 4/1972 | Marshall et al. | 177/208 |
| 4,064,955 | 12/1977 | Dyck | 177/255 X |
| 4,078,624 | 3/1978 | Bradley | 177/255 X |

Primary Examiner—George H. Miller, Jr.
Attorney, Agent, or Firm—St. Onge, Steward, Johnston, Reens & Noë

[57] ABSTRACT

Platform weighing apparatus for measuring a load comprises a stationary base platform and a load supporting platform. A stabilizing system mounts the load supporting platform on the base platform for reciprocal movement relative thereto and constrains the platforms to be generally parallel throughout the range of such movement. Furthermore, the stabilizing system, while permitting vertical reciprocal movement between the platforms resists relative horizontal movement between them. This stabilizing system includes first and second stabilizing assemblies, each having at least two stabilizing arms which are linked for pivoted movement on one common pivot axis at one end to the base platform and which are also linked for pivoted movement on a second common pivot axis at the opposite end to the load supporting platform. The pivot axes are mutually parallel. A torsion resistant shaft rigidly interconnects the arms of each stabilizing assembly to hold them in coplanar relation with the pivot axes. The pivot axes of the first stabilizing assembly extend in a generally perpendicular relation to the pivot axes of the second stabilizing assembly. A single load cell is mounted between the base platform and the load supporting platform to measure relative vertical force therebetween as an indication of the weight of a load on the load supporting platform.

27 Claims, 7 Drawing Figures

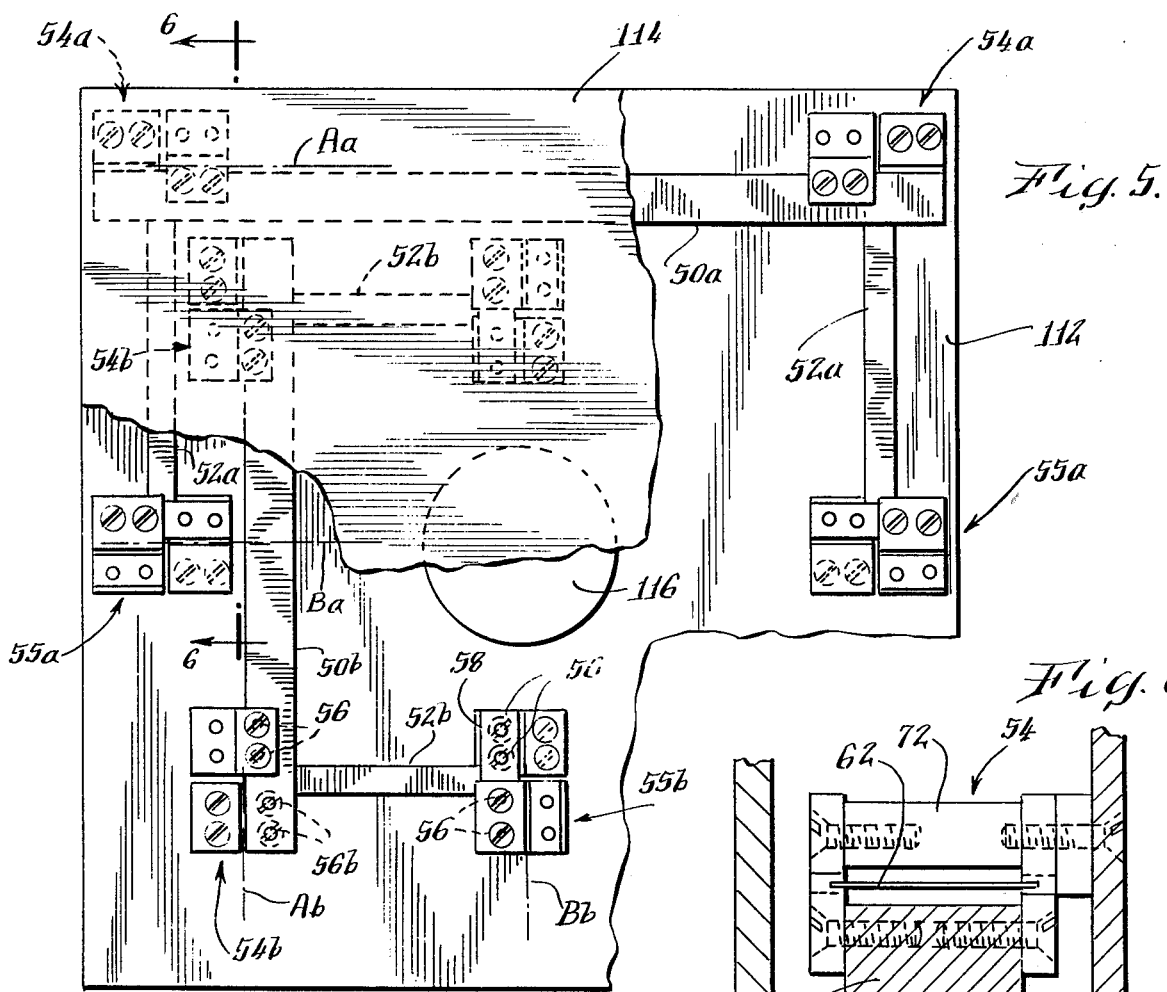
Fig. 5.
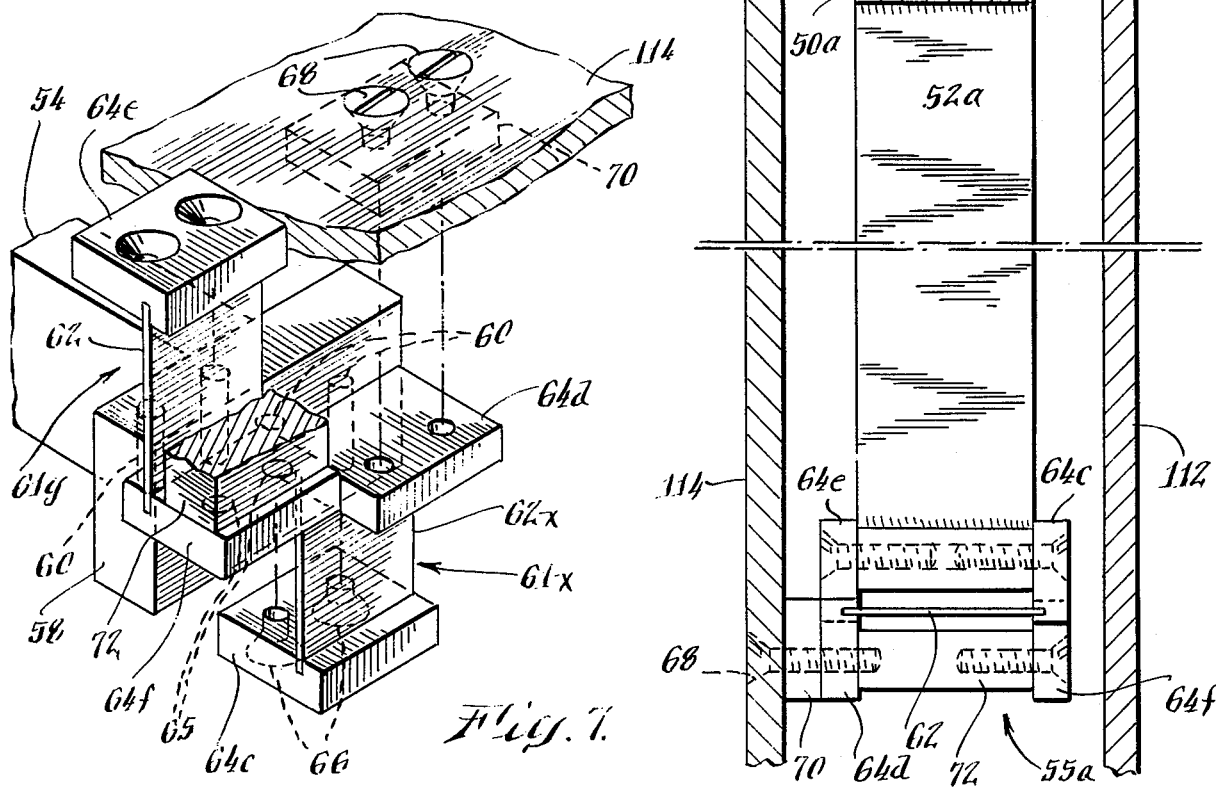
Fig. 6.
Fig. 7.

PLATFORM WEIGHING APPARATUS

BACKGROUND OF THE INVENTION

1. Field of the Invention

The present invention relates to a platform weighing apparatus of the general type that includes a stationary base platform and a load supporting platform. The supporting platform is mounted for vertical reciprocal movement toward and away from the base platform when a load is positioned on it.

Platform weighing apparatus of this general type have great utility in heavy industrial applications. They may, for example, be used to weigh large objects such as loaded hand trucks or other large containers of heavy material. However, such apparatus may also be adapted for lighter load weighing applications.

2. Description of the Prior Art

Common platform weighing apparatus of the type to which this invention relates include a base platform of square or rectangular shape. Ordinarily, four load measuring devices such as hydraulic load cells or electric strain gauges are mounted on the base platform at each of its corners. A load supporting platform, of shape similar to the base platform, is then mounted above the base platform, supported by the load measuring devices. Accordingly, when a load is placed on the supporting platform it produces an output signal from the load measuring devices by physical movement of the supporting platform relative to the base platform. Such movement will increase the hydraulic fluid pressure in a hydraulic load cell or cause an electric strain gauge to generate an electric output signal as an indication of the measured load.

Linkages are also provided between the base and load supporting platforms that permit relative vertical movement but resist horizontal movement therebetween.

Because the load is often not placed in the physical or dynamic center of the load supporting platform, different ones of the load measuring devices may produce different output signals. Therefore, a totalizer device may be used to total the output signals of the several load measuring devices and produce a single output signal indicative of the actual weight of the load.

U.S. Pat. No. 3,933,212 (Bradley et al.) discloses a high capacity platform weighing apparatus of the general type described above and U.S. Pat. No. 4,078,624 (Bradley) discloses as similar apparatus that is, however, of modular construction. In each, when the apparatus is assembled, stabilizing linkages extend between the load supporting and base platforms parallel to and adjacent each edge of both platforms. Each linkage operates independently of the other three.

Another weighing apparatus of the type generally described above is disclosed in U.S. Pat. No. 2,742,278 (Carleton, Jr.) and includes a base platform, a middle-scale platform and an upper-scale platform mounted above the middle-scale platform. The upper-scale platform is supported above to the base platform at each of its four corners by one of four electric load cells. The middle-scale platform is connected to the base platform by four tie or stabilizer rods or linkages, each of which extends parallel to and adjacent one edge of the platforms. Limited vertical movement is permitted between the middle-scale platform and the base platform by slight bending of each tie rod. Again, however, each tie rod may be bent independently of bending of other rods.

U.S. Pat. No. 3,658,143 (Schwartz) discloses a weighing device in which a load supporting platform is linked to a single load measuring device by a lever system that incorporates flexure plates and flexible cables.

Still other platform weighing devices are shown in U.S. Pat. Nos. 3,354,973 (Farquhar); 4,064,955 (Dyck) and 3,338,324 (Burke et al.).

SUMMARY OF THE INVENTION

The platform weighing apparatus of the present invention is both simple and efficient. It eliminates all but one of the four load measuring devices used in certain prior art apparatus described above. It, therefore, also eliminates the need for a totalizer apparatus. However, this weighing apparatus produces accurate weight measurements regardless of the location of the load on the supporting platform.

In its preferred embodiment, the weighing apparatus of the present invention includes a stationary base platform and a load supporting platform. A stabilizing system mounts the load supporting platform on the base platform for a reciprocal vertical movement relative thereto and constrains the platforms to be generally parallel throughout the range of this movement. Further, the stabilizing system resists relative horizontal movement between the platforms. The stabilizing system comprises a first and a second stabilizing assembly, each of which has at least two stabilizing arms that are linked for pivoted movement on one common pivot axis at one end to the base platform and that are further linked for pivoted movement on a second common pivot axis at the opposite end to the load supporting platform. These pivot axes are mutually parallel. The arms are rigidly interconnected to be held in coplanar relation with the pivot axes by a shaft or bar that resists twisting or torsion. Anti-friction bearings or flexure plate assemblies are provided to link the stabilizing arms to the platforms.

The pivot axes of the first stabilizing assembly extend in a generally perpendicular relation to the pivot axes of the second stabilizing assembly. Accordingly, the movement of the load supporting platform relative to the base platform is stabilized in all horizontal directions. Additionally, because the arms of the respective assemblies are held in rigid, coplanar relation with their associated pivot axes, tipping of the load supporting platform relative to the base platform due to the location of the load on the supporting platform, which otherwise would cause them to be nonparallel, is effectively resisted.

A single load measuring device, and in the preferred embodiment a hydraulic load cell, is mounted between the base platform and the load supporting platform. This device measures a load on the load supporting platform by measuring relative vertical force between the respective platforms.

Accordingly, it is a principal object of the present invention to provide a platform weighing apparatus that includes a stabilizing system for preventing tipping of the load supporting platform with respect to a base platform.

It is a further object of the present invention to provide such a stabilizing system that allows a full load supported on the load supporting platform to be transmitted to a load measuring device such as a hydraulic load cell without regard to load position on the load supporting platform.

It is a further object of the present invention to provide a platform weighing apparatus that uses only one load measuring device. Accordingly, the need for three similar devices also used in conventional apparatus as well as a totalizer apparatus is eliminated.

It is still a further object of the present invention to provide a weighing apparatus having a low profile that may be installed at a variety of locations to measure loads driven or otherwise placed thereon. This apparatus also is simple and, therefore, reliable yet may be made at low cost.

These and other objects of the present invention will be pointed out in or will be understood from the following detailed description of the preferred embodiments provided below in conjunction with the accompanying drawings.

BRIEF DESCRIPTION OF THE DRAWINGS

FIG. 5 is a plan view, similar to that shown in FIG. 2, of a second embodiment of the present invention also with the load supporting platform partly removed.

FIG. 6 is a side elevational view of the apparatus showing a flexure plate system for providing pivoted movement between the stabilizing arms and one of the platforms.

FIG. 7 is an exploded perpsective view of this flexure plate system.

DETAILED DESCRIPTION OF THE PREFERRED EMBODIMENT

Figure 1:
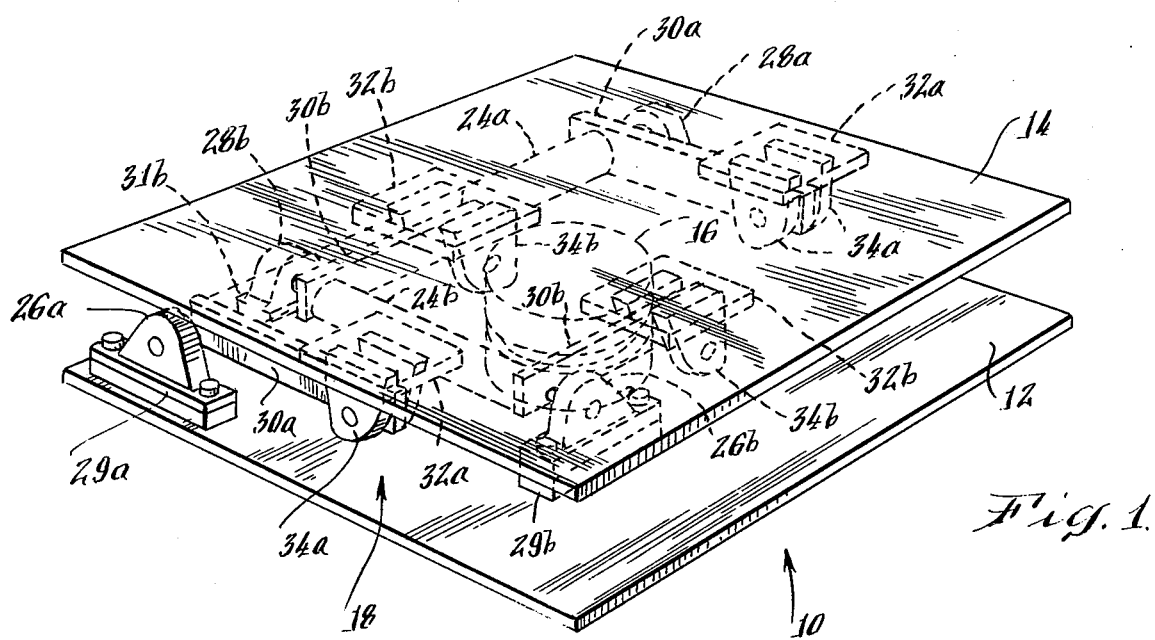
FIG. 1 is a perspective view of one embodiment of the weighing apparatus of the present invention.

A first embodiment of the platform weighing apparatus of the present invention is shown in FIG. 1 and is generally indicated at 10. As can be seen there, the apparatus has a top of square shape and has a low profile or height. Therefore, the apparatus may be recessed in a suitable cavity on a supporting structure so that objects to be weighed may be rolled or driven onto its upper surface. Alternatively, it may be equipped with side ramps so that objects to be weighed may similarly be rolled or driven onto its upper surface.

While in its preferred embodiment, the apparatus has a square top surface, this surface may be made in any shape or size depending upon the application for the apparatus. This apparatus is also particularly well suited for applications in which large loads are measured but may be adapted for lighter applications.

Figure 4:
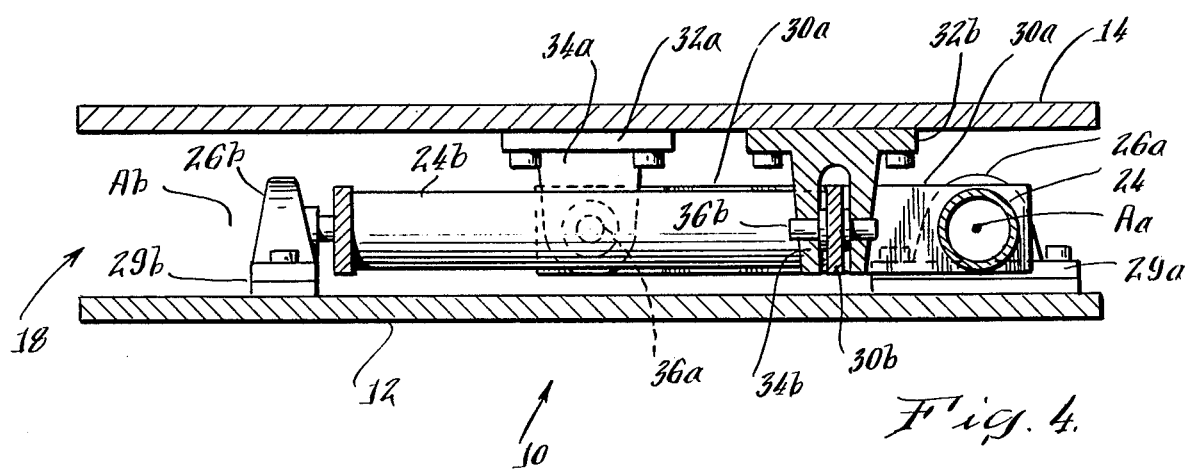
FIG. 4 is a discontinuous cross-sectional view of this apparatus taken on plane 4—4.
Figure 2:
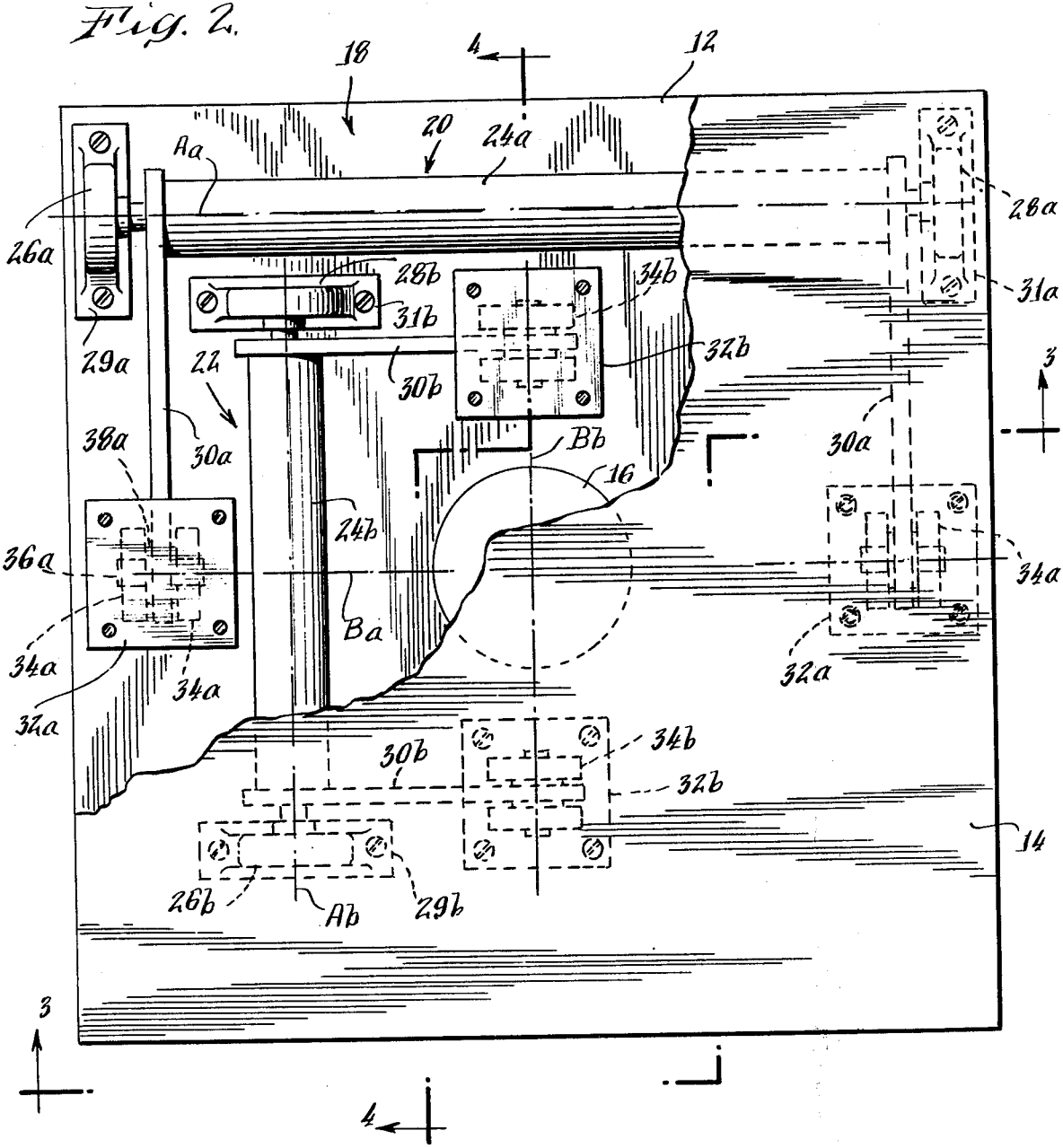
FIG. 2 is a plan view of this first embodiment of the weighing apparatus with the load supporting platform partly removed to show the stabilizing system.
Figure 3:
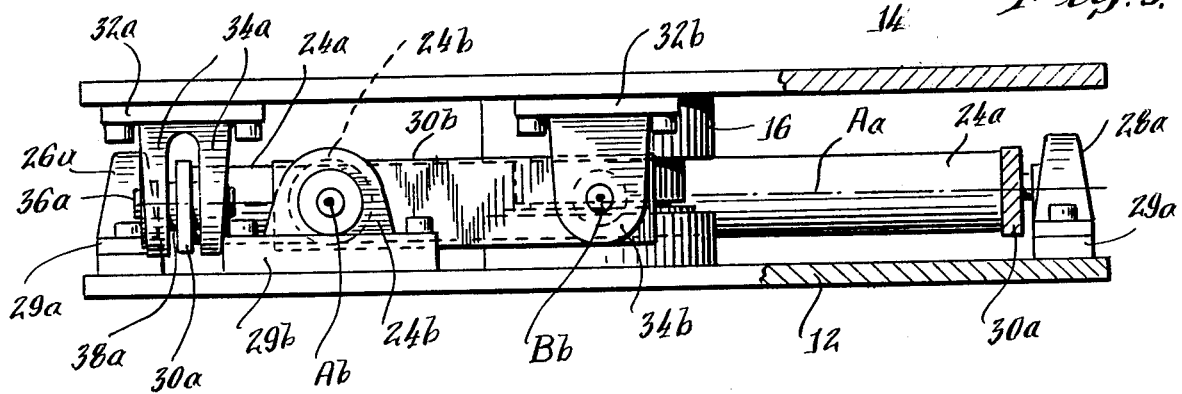
FIG. 3 is a front elevational view of this apparatus taken partly in cross-section on plane 3—3 in FIG. 2.

As shown in further detail in FIGS. 2 through 4, the weighing apparatus of the invention comprises a square base platform 12 that is made of any suitable rigid, heavy duty material such as steel. A load supporting platform 14 having similar shape and made of similar material is mounted above the base platform 12 by a stabilizing system described below in detail.

A load measuring device 16, which in the preferred embodiment is a hydraulic load cell similar to that shown in U.S. Pat. No. 3,089,518 (Bradley), is mounted between the base platform and the load supporting platform. The load measuring device determines the weight of loads present on the supporting platform 14 by measuring vertical force between the supporting platform and the base platform in a well-known manner. However, the weighing apparatus of the invention will operate equally well with other types of load measuring devices such as electric strain gauges.

The stabilizing system for mounting the load supporting platform on the base platform permits such reciprocal vertical movement while constraining the platforms to be generally parallel throughout the range of such movement and resisting relative horizontal movement. More particularly, this stabilizing system, indicated generally at 18, prevents the load supporting platform from tipping relative to the base platform yet allows the full weight of a load to be transmitted to the load measuring device 16 regardless of where the load is positioned on the supporting platform 14. The stabilizing system comprises a first or x-axis stabilizing assembly, generally indicated at 20 and a second or y-axis stabilizing assembly, generally indicated at 22. The components of each of the respective stabilizing assemblies are similar. Therefore, like reference numerals will be used for such similar components with those forming parts of the x-axis stabilizing assembly denoted in the Figures with the letter "a" and those for the y-axis stabilizing assembly denoted in the Figures with the letter "b". Description of one assembly will serve to describe the other.

Accordingly, each stabilizing assembly includes a torsion resistant shaft, bar or torque tube 24 that is journalled for pivoted movement in opposed, primary anti-friction bearings 26 and 28 respectively carried in journal blocks 29 and 31 mounted on the upper face of the base platform. The bearings and journal blocks are mounted so that the axis of each torsion resistant shaft 24 extends parallel to the base and load supporting platform. Furthermore, the axis of the shaft and bearings constitutes a first common pivot axis A.

A stabilizing arm 30 is mounted for pivoted movement with the shaft at each end of the shaft. Pivoted arm movement relative to the base platform is about the pivot axis A. Specifically, as can be seen in FIGS. 2 and 3, in the preferred embodiment an arm is welded at one of its ends to one end of the shaft 24 and both arms extend in mutually parallel relation perpendicularly away from the shaft. The arms 30 together with the pivot axis A, define a single plane or are coplanar. Further, the shaft 24a of the x-axis stabilizing assembly extends in a generally perpendicular relation, and in the preferred embodiments perpendicularly, to the shaft 24b of the y-axis stabilizing assembly. Because the shaft resists torsion, the arms 30 are rigidly held in coplanar relation with the pivot axis A throughout the range of their pivoted movement.

As can be seen in FIGS. 2, 3 and 4, a pair of U-shaped journal brackets 32 are mounted on the downwardly facing surface of the load supporting platform for each stabilizing assembly. Each bracket comprises a pair of depending ears 34. A shaft 36 is mounted between the ears to span the distance between them and to engage a secondary self aligning anti-friction bearing 38 mounted in the end of each arm 30, opposite that welded to the shaft 24. Furthermore, the axes of the shafts 36 define a second common pivot axis B. Pivoted arm movement relative to the load supporting platform 14 is about the pivot axis B. Both pivot axes A and B extend in mutually parallel relation and the pivot axes Aa and Bb of the first stabilizing assembly extend in generally perpendicular relation, perpendicularly in the preferred embodiments, to the pivot axes Ab and Bb of the second stabilizing assembly. The pivot axis B is also coplanar with the arms 30 and pivot axis A of each stabilizing assembly.

Accordingly, it will be appreciated that the load supporting platform is supported for reciprocal movement toward and away from the base platform by the two stabilizing assemblies. The first or x-axis stabilizing assembly 20 supports the load supporting platform in the x-direction and the second or y-axis stabilizing assembly supports the load supporting platform in the y-direction. Because each stabilizing assembly includes a rigid, U-shaped, coplanar structure comprising the shaft 24 and the arms 30, tipping of the load supporting platform is resisted. Because support is provided in both the x- and y-directions, load may be received on the load supporting platform at any position and transferred in its entirety to the load cell.

In the preferred embodiments, the pivot axes B defined by the shafts 36 of both stabilizing assemblies pass through the vertical axis C of the load measuring device 16. While this arrangement is not essential, it contributes the overall balance of the apparatus.

A second embodiment of the present invention is shown in FIGS. 5 through 7 and is, in principle, similar to that shown in FIGS. 2 through 4. However, the x- and y-axis stabilizing assemblies are of different construction from those of the first embodiment. In particular, in the second embodiment each of the stabilizing assemblies includes a torsion bar 50. Two stabilizing arms 52 are securely attached to the torsion bar, for example by welding, to project perpendicularly therefrom and to rigidly remain in coplanar relation with the bar 50. In this embodiment the arms extend in mutually parallel relation. The torsion bar is connected at its opposite ends to the upper surface of the base platform 112 and the free ends of the arms 52 are attached to the lower surface of the load supporting platform 114 by primary and secondary flexure plate systems 54 and 55 respectively. The flexure plate systems 54 joining the torsion bar 50 and the base platform 112 define a common pivot axis A for the arms 52 about the base platform. The flexure plate systems 55 joining the free ends of the arms 52 to the load supporting platform 114 define a second common pivot axis B for the arms 52 about the base platform. The pivot axes A and B are mutually parallel and are coplanar with the arms in each stabilizing assembly. These relationships are the same as those in the first embodiment.

More particularly, the torsion bar 50 is formed at its opposite ends with four threaded bores 56. Each stabilizing arm 52 has a cross bar 58 attached thereto at its end opposite that attached to the torsion bar that extends in parallel relation to the torsion bar and also has four threaded bores 60 formed therein.

As shown best in FIG. 7, each flexure plate system includes two flexure plate assemblies 61, each including one flexure plate 62 and two mounting brackets 64 each attached to and projecting from the plane of the flexure plate one at each end of the plate. The mounting brackets project to opposite sides of each flexure plate 62 at its opposite ends and together therewith thus define an S-shaped structure. The two flexure plate assemblies of each flexure plate system are mounted in opposing senses. For example, in the system connecting one stabilizing arm cross bar 58 shown in FIG. 7 to the undersurface of the load supporting platform, one mounting bracket 64c of one flexure plate assembly 61x projects under and is secured to the lower surface of the cross bar 58 by machine screws 66 threaded into two bores 60. The opposite mounting bracket 64d of this assembly 61x projects from the flexure plate 62x away from the cross bar and is secured by machine screws 68 to the undersurface of the load supporting platform 114. A small spacer block 70 may be interposed between the mounting bracket 64d and the supporting platform if necessary.

The other flexure plate assembly 61y of this system has a mounting bracket 64e attached to the upper surface of the cross bar by machine screws 66 threaded into two bores 60. The opposite mounting bracket 64f projects away from the cross bar into the region of its lower surface and is secured to an elongated spacer block 72 by machine screws 66 threaded into bolt holes 65. The block 72 is, in turn, secured to the under surface of the load supporting platform 114 by similar machine screws 66. The flexure plates of each system are coplanar as can be seen in the figures.

Each of the flexure plate systems for interconnecting the torsion bars and other cross bars and the associated base or load supporting platform are the same as that described above.

Accordingly, the stabilizing arm assembly, comprising the stabilizing arms and torsion bars, may be pivoted upwardly and downwardly as in the first embodiment by bending of the flexure plates of each flexure plate system. Because the actual movement of the load supporting platform relative to the base platform is small, resistance to such movement by the flexure plates is negligible. Also because such movement is small, binding of the respective stabilizing arm assemblies between the load supporting and base platforms does not occur. As it was the case with the first embodiment, the rigid stabilizing arm assembly holds the load supporting platform for movement relative to the base platform in generally parallel relation. Tipping of the load support platform is resisted regardless of the location of the load on the supporting platform.

As can be seen in FIGS. 2 and 5, in both embodiments at least a portion of the U-shaped structure comprising the arms and torsion resistant shaft of the second stabilizing assembly 22 is mounted within the area defined by the U-shaped structure comprising the arms and the torsion resistant shaft of the first stabilizing assembly 20. This relationship is space efficient.

Accordingly, it will be appreciated that the platform weighing device of the present invention is simple yet effective and economical. Further, three of four load cells are eliminated and a totalizer for four load cells is unnecessary. Therefore, the apparatus of the present invention in either of its embodiments provides substantial advantages.

Although specific embodiments of the present invention have been described above in detail, it is to be understood that this is for purposes of illustration. Modification may be made to the described structures in order to adapt this platform weighing device to particular applications.

What is claimed is:

1. Apparatus for weighing a load comprising:
   A. a stationary base platform;
   B. a load supporting platform;
   C. stabilizing means mounting said load supporting platform on said base platform for reciprocal movement relative thereto and constraining said platforms to be generally parallel throughout the range of said movement, said stabilizing means including first and second stabilizing assemblies each having,
  (1) at least two arms, each of said arms being linked for pivoted movement on a first common pivot axis at one end to said base platform and being linked for pivoted movement on a second common pivot axis at the opposite end to said load supporting platform with said pivot axes being mutually parallel; and,
  (2) means for rigidly interconnecting said arms in coplanar relation with said pivot axes, said pivot axes of said arms of said first stabilizing assembly extending in nonparallel relation to said pivot axes of said arms of said second stabilizing assembly; and
D. load cell means mounted between said base platform and said load supporting platform for measuring relative force therebetween as an indication of the weight of a load on said load supporting platform.

2. The apparatus as claimed in claim 1, further comprising for each said stabilizing assembly, primary anti-friction bearings mounted on said base platform, said one end of each arm being linked to one said primary bearing for said pivoted movement.

3. The apparatus as claimed in claim 1, further comprising for each said stabilizing assembly, secondary anti-friction bearings mounted on said load supporting platform, said opposite end of each arm being linked to one said secondary bearing for said pivoted movement.

4. The apparatus as claimed in claim 1, wherein for each said stabilizing assembly, said means for rigidly interconnecting said arms comprises a torsion resistant shaft to which said arms are rigidly secured.

5. The apparatus as claimed in claim 4, further comprising for each said stabilizing assembly, primary anti-friction bearings mounted on said base platform, said shaft being journalled between said primary bearings for pivoted movement therein with the axis of said shaft extending parallel to the plane of said platform, and said one end of each said arm being rigidly secured to said shaft for pivoted movement therewith.

6. The apparatus as claimed in claim 1, further comprising for each said stabilizing assembly, primary flexure plate means mounted with said base platform, said one end of each arm being linked to one said primary flexure plate means for said pivoted movement.

7. The apparatus as claimed in claim 6, said means for rigidly interconnecting said arms including a torsion bar having a top confronting said load supporting platform and a bottom confronting said base platform;
  said flexure plate means comprising two flexure plate assemblies each having a flexure plate, and spacer means having one end secured to said base platform and another end projecting into the region of the top of said torsion bar;
  one said flexure plate assembly having one end of the flexure plate secured to the top of said torsion bar and the opposite end of the flexure plate secured to said base platform; the other flexure plate assembly having one end of the flexure plate secured to the bottom of said torsion bar and the other end of the flexure plate secured to said other end of said spacer means with said flexure plates in coplanar relation.

8. The apparatus as claimed in claim 1, further comprising for each said stabilizing assembly secondary flexure plate means mounted on said load supporting platform, said opposite end of each arm being linked to one said secondary flexure plate means for said pivoted movement.

9. The apparatus as claimed in claim 8, said arms each having a cross bar mounted at said opposite end having a top confronting said load supporting platform and a bottom confronting said base platform;
  said flexure plate means comprising two flexure plate assemblies each having a flexure plate, and spacer means having one end secured to said load supporting platform and another end projecting into the region of the bottom of said cross bar;
  one said flexure plate assembly having one end of the flexure plate secured to the bottom of said cross bar and the opposite end of the flexure plate secured to said load supporting platform, the other said flexure plate assembly having one end of the flexure plate secured to the top of said cross bar and the other end of the flexure plate secured to said other end of said spacer means with said flexure plates in coplanar relation.

10. The apparatus as claimed in claim 1, 4, 5, 2, 3, 6, 7, 8, or 9 wherein said load cell means has an axis extended perpendicularly between said platforms and wherein said second common pivot axis of said arms of each said stabilizing assembly intersects the axis of said load cell means.

11. The apparatus as claimed in claim 1, 4, 5, 2, 3, 6, 7, 8 or 9 wherein said load cell means comprises a hydraulic load cell.

12. The apparatus as claimed in claim 1, 4, 5, 2, 3, 6, 7, 8 or 9 wherein said platforms are spaced apart by a small distance relative to their lateral extent.

13. The apparatus as claimed in claim 1, 4, 5, 2, 3, 6, 7, 8 or 9 wherein said arms and said means for rigidly interconnecting said arms of each said assembly define a U-shaped structure and wherein at least a portion of one of said assemblies is positioned within the area defined by the U-shaped structure of the other of said assemblies.

14. Apparatus for weighing a load comprising:
A. a base platform;
B. a load supporting platform;
C. stabilizing means mounting said load supporting platform on said base platform for reciprocal movement relative thereto and constraining said platforms to be generally parallel throughout the range of said movement, said stabilizing means including first and second stabilizing assemblies each having:
  (1) two spaced, primary anti-friction bearings mounted on said base platform;
  (2) a torsion resistant shaft journalled between said primary bearings for pivoted movement therein with the axis of the shaft extending parallel to the plane of said platform;
  (3) at least two arms one secured at each end to said shaft for pivoted movement therewith and being generally coplanar therewith; and
  (4) secondary anti-friction bearings mounted on said load supporting platform and defining a pivot axis extending parallel to the axis of said shaft, the end of each arm opposite said one end being journalled for pivoted movement on said pivot axis in one said secondary bearing, said shaft of said first stabilizing assembly being generally perpendicular to said shaft of said second stabilizing assembly; and D. load cell means mounted between said base platform and said load supporting platform for measuring relative force therebetween as an indication of the weight of a load supported on said supporting platform.

15. The apparatus as claimed in claim 14 wherein said load cell means has an axis extending perpendicularly between said platforms and wherein said pivot axis intersects said load cell means axis.

16. The apparatus as claimed in claim 14 wherein said arms of each said stabilizing assembly extend in mutually parallel relation perpendicularly from said shaft.

17. The apparatus as claimed in claim 14 wherein said shaft of said first stabilizing assembly is perpendicular to said shaft of said second stabilizing assembly.

18. The apparatus as claimed in claim 14, 15, 16 or 17 wherein said load cell means comprises a hydraulic load cell.

19. The apparatus as claimed in claim 14, 15, 16 or 17 wherein said platforms are spaced apart by a small distance relative to their lateral extent.

20. The apparatus as claimed in claim 14, 15, 16 or 17 wherein said shaft and said arms of each of said stabilizing assemblies define a U-shaped structure and wherein at least a portion of one of said stabilizing assemblies is mounted within the area defined by the U-shaped structure of the other of said assemblies.

21. Apparatus for weighing a load comprising:
A. a base platform;
B. a load supporting platform;
C. stabilizing means mounting said load supporting platform on said base platform for reciprocal movement relative thereto and constraining said platforms to be generally parallel throughout the range of said movement said stabilizing means including first and second stabilizing assemblies each having:
  (1) two spaced primary flexure plate means mounted on said base platform;
  (2) a torsion resistant bar mounted for pivoted movement on said primary flexure plate assemblies for pivoted movement thereon with the axis of said bar extending parallel to the plane of said platform;
  (3) at least two arms one rigidly secured at each end to said torsion bar for pivoted movement therewith and projecting in coplanar relation therefrom; and
  (4) secondary flexure plate means mounted on said load supporting platform and defining a pivot axis extending parallel to the axis of said torsion bar, the end of each arm opposite said one end being linked to one said flexure plate assembly for pivoted movement on said pivot axis, said torsion bar of said first stabilizing assembly being generally perpendicular to said torsion bar of said second stabilizing assembly; and
D. load cell means mounted between said base platform and said load supporting platform for measuring relative force therebetween as an indication of the weight of a load supported on said supporting platform.

22. The apparatus as claimed in claim 21, said torsion bar having a top confronting said load supporting platform and a bottom confronting said base platform; each said primary flexure plate means comprising two primary flexure plate assemblies each having a flexure plate, and spacer means having one end secured to said base platform and another end projecting into the region of the top of said torsion bar; one said primary flexure plate assembly having one end of the flexure plate secured to the top of said torsion bar and the opposite end of the flexure plate secured to said base platform; the other primary flexure plate assembly having one end of the flexure plate secured to the bottom of said torsion bar and the other end of the flexure plate secured to said other end of said spacer means with said flexure plates in coplanar relation.

23. The apparatus as claimed in claim 21, each said arm each having a cross bar mounted at said opposite end having a top confronting said load supporting platform and a bottom confronting said base platform;

said secondary flexure plate means comprising two secondary flexure plate assemblies each having a flexure plate, and spacer means having one end secured to said load supporting platform and another end projecting into the region of the bottom of said cross bar;

one said secondary flexure plate assembly having one end of the flexure plate secured to the bottom of said cross bar and the opposite end of the flexure plate secured to said load supporting platform, said other secondary flexure plate assembly having one end of the flexure plate secured to the top of said cross bar and the other end of the flexure plate secured to said other end of said spacer means with said flexure plates in coplanar relation.

24. The apparatus as claimed in claim 21, 22 or 23 wherein said load cell means comprises a hydraulic load cell.

25. The apparatus as claimed in claim 21, 22, or 23 wherein said platforms are spaced apart by a small distance relative to their lateral extent.

26. The apparatus as claimed in claim 21, 22, or 23 wherein said torsion bar and said arms of each of said stabilizing assemblies define a U-shaped structure and wherein at least a portion of one of said stabilizing assemblies is mounted within the area defined by the U-shaped structure of the other of said assemblies.

27. Stabilizing means for a platform load weighing apparatus including a base platform and a load supporting platform, said stabilizing means mounting said load supporting platform on said base platform for reciprocal movement relative thereto and constraining said platforms to be generally parallel throughout the range of said movement; said stabilizing means comprising:

first and second stabilizing assemblies each having at least two arms, each of said arms being linked for pivoted movement on a first common pivot axis at one end to said base platform and being linked for pivoted movement on a second common pivot axis at the opposite end to said load supporting platform with said pivot axes being mutually parallel, and means for rigidly interconnecting said arms in coplanar relation with said pivot axes, said pivot axes of said arms of said first stabilizing assembly extending in generally perpendicular relation to said pivot axes of said arms of said second stabilizing assembly.

* * * * *